United States Patent [19]

Lucas

[11] Patent Number: 4,726,270
[45] Date of Patent: Feb. 23, 1988

[54] STAMPING SYSTEM

[76] Inventor: Rose E. Lucas, 4127 Knoll Dr., P.O. Box 246, Hamburg, N.Y. 14075

[21] Appl. No.: 688

[22] Filed: Jan. 5, 1987

[51] Int. Cl.⁴ .......................... B26D 7/26; B26F 1/14
[52] U.S. Cl. ........................................ 83/13; 83/698; 279/30
[58] Field of Search .................... 83/698, 13, 137, 140, 83/138; 279/30, 79, 76, 22; 403/9, 328

[56] References Cited

U.S. PATENT DOCUMENTS 1,904,951  4/1933  Peterson ............................... 83/698
4,332,179  6/1982  Wallis .................................... 83/698
4,558,620  12/1985 Wallis .................................... 83/698

Primary Examiner—E. R. Kazenske
Assistant Examiner—Eugenia A. Jones
Attorney, Agent, or Firm—James J. Ralabate

[57] ABSTRACT

A method and apparatus for a punch removal system in which the punch is pulled free of the retainer block without the removal of the stripper plate. The punch end is larger than the punch shank and has an access hole in vertical alignment with an access hole in the retainer block.

4 Claims, 7 Drawing Figures

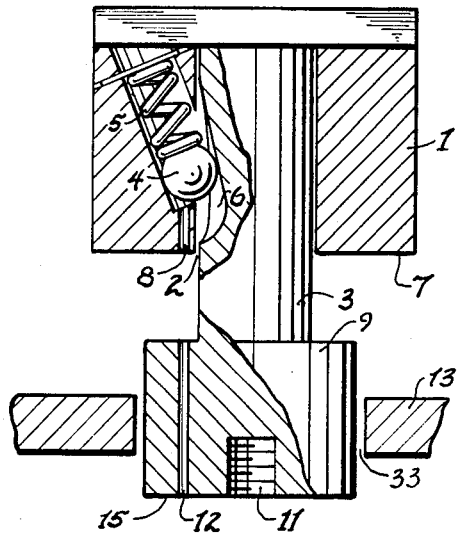
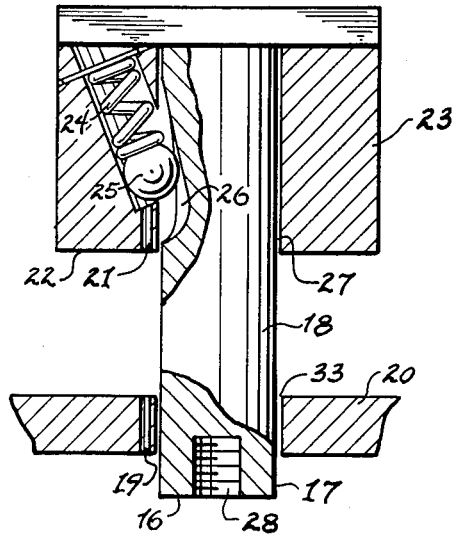
Fig. 1
Fig. 2
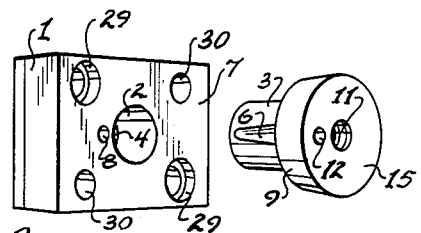
Fig. 3
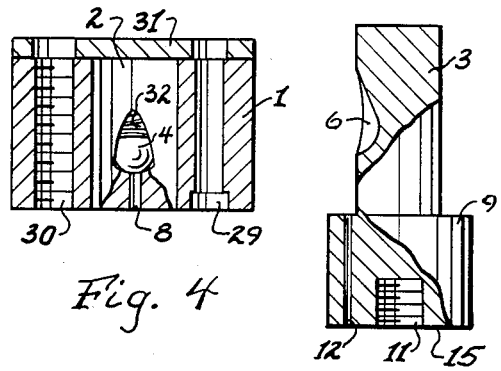
Fig. 4
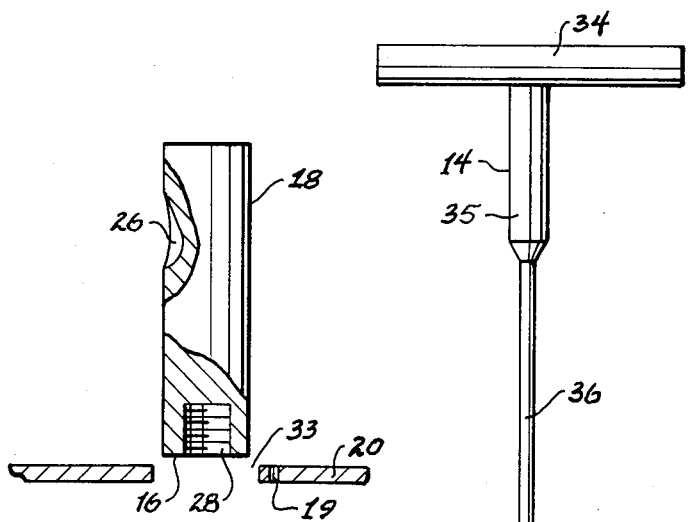
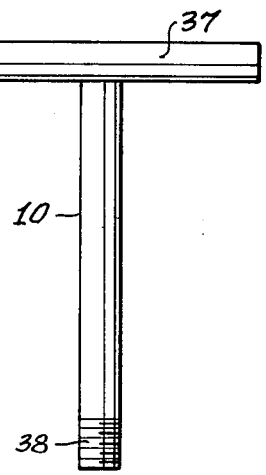
Fig. 5
Fig. 6
Fig. 7

STAMPING SYSTEM

This invention relates to a novel stamping system and, more particularly, to an apparatus that reduces the punch removal time significantly.

BACKGROUND OF THE INVENTION

It is known in the prior art to use retainer blocks having a cylindrical central aperture wherein a ball lock is positioned therein and is spring loaded to lock in place a punch shank. Punches that are insertable therein are also known to have an elongated shank having a teardrop cutaway for locking with the spring loaded ball lock of the retainer block. Punches and retainers of this type are well known and described in detail in several catalogs and publications such as "Catalog 1000" by Pivot Punch Corporation of Lockport, N.Y. which is hereby incorporated by reference herein. This catalog describes the state of the art pucnhes, ball locks, die buttons, ball lock retainers and other standard products.

U.S. Pat. No. 1,860,998 also describes a tool holder wherein a ball lock retainer and teardrop containing type punches are used. This patent desscribes the ball-locking mechanism used to retain tools or punches in position. The provision of a tool holder is described having this locking element mounted in the retainer and so arranged that a maximum bearing is imparted on the periphery of the tool.

In all these prior art systems and arrangements there is used a stripper plate which removes the metal being worked on from the punch. The central hole of the stripper plate is always wider than the circumference of the punch. The punch extends from and through the stripper plate upward and into the retainer block. When the punch needs to be changed because it becomes worn, broken, dull or needs to be changed for a changeover of tooling or punch needs, it is always required in the prior art to first remove the stripper plate. Thus, in order to have access to the punch for removal, it is necessary to remove first the stripper plate. Generally, one would use a ball depressor to first push the ball lock out of contact with the punchshank and pliers are used to remove the punch. After the punch is sharpened or replaced, it is then reinserted or inserted into the retainer aperture to again depress the ball lock and lock the punch into position. The punch is then rotated to make sure it is locked in place when the ball depressor is removed. After this is compelted, the stripper plate is then reattached to the die. This complete process is very time consuming and when several units are involved, the changeover time becomes significant.

Each prior art retainer block is equipped with a small guide aperture (adjacent the central punch receiving hole) which is adapted to receive a ball depressor to loosen the grip or unlock the punch shank. After the stripper plate has been removed, the ball depressor is inserted into this guide aperture and the punch shank removed from the retainer hole. This ball depressor cannot be inserted without first removing the stripper plate since the stripper plate blocks access thereto. Therefore, to remove present punches one would require an allen wrench to fit stripper bolts, a pliers or vice grip to grab the punch with to remove it from the retainer block.

SUMMARY OF THE INVENTION

It is therefore an object of this invention to provide a punch removal system devoid of the above-noted disadvantages.

Another object of this invention is to provide a fast and efficient means for removal of a punch from a retainer block.

Yet another object of this invention is to provide an apparatus for removing punches from retainer blocks that can be easily adapted in presently used systems.

Another object of this invention is to provide a system for removal of punches from retainers whereby damage to either unit is avoided.

The foregoing objects and others are accomplished by the present invention generally speaking by providing a system wherein the punch has a central threaded aperture and in certain instances later described also has an access aperture for receiving the ball depressor. The depressor is merely inserted into this access aperture through the cap of the punch into the access aperture of the retainer block to loosen the punch. After it is loosened a threaded T-wrench is screwed into said central threaded aperture and the punch easily removed.

In a second embodiment where the punch cap (or terminal portion) is smaller than the diameter of the stripper plate opening, then an access hole or aperture is located in the stripper plate in alignment with the access aperture in the retainer block. When the ball depressor is inserted through the access opening or hole in the stripper plate and into and through the access hole in the retainer block the punch is then loosened and ready to be removed. Again, as in the prior embodiment, a threaded T-wrench is screwed into a central threaded opening in the punch first, then the ball depressor is inserted and the punch pulled free of the retainer block.

In both embodiments of the present invention, a central threaded opening is located in the midpoint of the outer face of the cylindrical punch. This central threaded opening is used together with the mating threaded T-wrench to pull the punch free of the retainer block. All of this is accomplished without the need for removing the stripper plate because the access hole in the retainer block is now accessible even with the stripper plate in place. In embodiment one, where the punch end (or punch cap) is larger than the punch shank, an access hole is placed through the width of said cap in vertical alignment with the access hole in the retainer block. A threaded T-wrench is first screwed into a central opening in the punch then the ball depressor is inserted through the cap access hole into the aligned retainer block hole to press against the spring-loaded ball to thereby push the ball away from the punch shank and release the punch from the retainer block.

In embodiment two, where the punch end is the same diameter as the punch shank, the access hole is located in the stripper plate in vertical alignment with the access hole in the retainer block. In the same manner as in embodiment one, the ball depressor is inserted through these access holes to push the ball away from the punch shank and thereby loosen the punch from the retainer. The T-wrench (or punch puller) is first screwed into the threaded central opening and the punch pulled from the retainer block without the necessity of removing the stripper plate.

The ball depressor used is a T-shaped tool having a narrow portion on the end opposite the handle. This narrow portion should be thin enough to fit through the access holes in the punch end cap, the stripper plate, and the access hole in the retainer block.

BRIEF DESCRIPTION OF DRAWINGS

FIG. 1 is a side view of a first embodiment of this invention.

FIG. 2 is a side view of a second embodiment of this invention.

FIG. 3 is a bottom perspective view of a retainer block with the punch of this invention.

FIG. 4 is a side view of a retainer block with the punch of this invention.

FIG. 5 is a side view of a second embodiment of a punch of this invention.

FIG. 6 is a side view of the ball depressor used in this invention.

FIG. 7 is a side view of the punch puller used in this invention.

DESCRIPTION OF DRAWINGS AND THE PREFERRED EMBODIMENTS

In FIG. 1 a first embodiment of this invention is illustrated. Retainer block 1 is the type used presently in the prior art, having a central opening 2 to receive a punch shank 3. Located internally is a ball lock 4 which is pressed upon shank 3 by spring means 5. The ball lock 4 is pressed against a teardrop cutaway or recess 6 that is located in the peripheral portion of shank 3. When spring 5 impels ball lock 4 against shank 3, it contacts teardrop recess 6 to provide a firmer locking action. Extending from a point adjacent said ball lock 4 to the lower terminal outside portion 7 of retainer block 1 is a retainer access hole 8 through which a ball depressor 14 (see FIG. 6) may be inserted via punch access hole 12 to push ball 4 away from shank 3 and thereby loosen the shank 3 from the retainer opening 2. The punch 9 including punch shank 3 is then removed from opening 2 by a punch puller 10 (see FIG. 7) which was previously screwed into threaded central opening 11. Punch puller 10 is pulled downward to remove the punch. Punch puller 10 is screwed into punch prior to insertion of ball depressor, otherwise one could not turn punch puller into punch as ball depressor 14 would obstruct turning T-type wrench. Stripper plate 13 remains as is and need not be removed since ball depressor 14 can be inserted through aligned access holes 12 and 8 to loosen the shank 3 from retainer 1. The purpose of the stripper 13 is to strip the metal being pierced from the punch making the hole so as not to distort the finished product. The stripper engages the metal being pierced prior to punch to keep metal flat against the die so as not to cause any shifting or pulling as hole is being pierced. In the prior art processes and apparatus, the stripper plate needs to be removed. This is so since the punch could not be removed because the access hole in the retainer block was obstructed by the stripper plate 13 and a ball depressor tool could not be inserted without removal of the stripper plate. The prior art punches do not contain a central threaded opening 11 nor an access hole 12 as in the present invention. The present invention eliminates the necessity for removing the stripper plates because of the access hole 12 drilled through the cap or face of punch 9 which is in alignment with the retainer access hole 8. This alignment permits the ball depressor tool 14 to be inserted to unlock the punch 9 and permit removal thereof. The threaded T-wrench or punch puller 10 is screwed into central opening 11, then the ball depressor 14 is inserted, pushes ball 4 away from shank 3 and the punch 9 removed for replacement or sharpening or repair or the like.

In FIG. 2 the same general system as in FIG. 1 is illustrated except that the terminal end 16 of punch 17 is of the same diameter as punch shank 18. Since access apertures require vertical alignment, in this embodiment an access hole 19 is located in stripper plate 20 so that it is aligned with retainer access hole 21 located in the bottom portion 22 of retainer or retainer block 23. Positioned in retainer 23 is spring 24 which presses ball lock 25 against the shank 18 of punch 17. Ball lock 25 is in contact with shank 18 firmly within retainer central opening 27. After puller 10 is screwed into opening 28 to remove punch 17 from central opening 27, ball depressor 14 of FIG. 6 is inserted through access hole 19 to retainer access hole 21 to thereby push ball lock 25 away from shank 18. Punch puller 10 of FIG. 7 which was previously screwed into punch threaded central opening 28 and punch 17 is pulled free of retainer block 23. This simple procedure for removing punches (herein intended to encompass any tool removed from a retainer) from retainers reduces the time required to about one-fourth that time previously required.

In FIG. 3 the retainer 1 and punch 9 of FIG. 1 is shown in a separated mode. Shank 3 fits into retainer central opening 2 where it contacts ball lock 4. As shank 3 is inserted into opening 2 teardrop recess 6 locks with ball lock 4 to secure punch 9 in retainer block 1. Access holes 12 of punch end 8 of retainer are aligned so that ball depressor 14 may be easily inserted therein to unlock punch 9 before removal. Mounting holes 29 are located in two diagonal corners of the bottom portion 7 of retainer block 1. Mounting holes 29 are required for screwing retainer block 1 to upper die section after location is determined. After retainer 1 is screwed in place, it is secured with dowels through dowel holes 20 to retain location and not shift. In the opposite diagonal corners are located dowel holes 30. Access hole 8 leads directly from the bottom portion 7 of the retainer block 1 to ball lock 4, so that ball depressor 14 can easily be inserted to unlock the punch 9. This feature is clearly shown in FIG. 4 where access hole 8 is opened from the outside bottom portion 7 to ball 4. The upper retainer block 31 closes off central opening 2 and spring housing 32. Punch 9 of FIGS. 1 and 3 is also shown in FIG. 4. Central threaded opening 11 is adapted to mate with punch puller 10 of FIG. 7. In this embodiment of the invention end portion or punch cap 15 has a diameter larger than that of punch shank 3. When the punch of punch cap 15 is larger than shank 3, the access hole 12 is located in and extends through the cap 15. When the diameter of the end portion is the same diameter or a smaller diameter than the diameter of shank 3 (or 18) then the access hole 19 is located in the stripper plate. In both embodiments it is necessary to have however a central threaded opening 11 or 28. In FIG. 5 the second embodiment is illustrated where the diameter of end portion 16 is the same (or can be smaller) as the diameter of shank 18, thus access hole 19 is located in stripper plate 20. In FIG. 6 ball depressor 14 is illustrated having a handle 34, an upper thick stem portion 35 and a stem insert 36. The stem insert 36 is the part that is inserted into apertures or access holes 8, 12, 19 and 21. Ball depressor 14 can be constructed of metal or any other suitably strong material. In FIG. 7 the punch puller 10 is illustrated having a handle portion 37 and a lower threaded portion 38. Threaded portion 38 fits into central openings 11 or 28 to attach to the respective punches for pulling them free from the retainer. This invention can be used in stamping metals, plastics or any other suitable material.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A stamping system comprising a retainer block, a punch and a stripper plate, said punch having an upper portion shank adapted to fit into a central opening in said retainer block, said shank adapted to lock with a ball lock located in said retainer block, said punch having a lower end portion adapted to fit through an opening in said stripper plate, said retainer block having at least one access hole adapted to receive a ball depressor tool, said access hole extending from the lower portion of said retainer block to said ball lock, said punch lower end portion having a thread central opening adapted to receive a threaded punch puller, said system having at least one additional second access hole in vertical alignment with the access hole of said retainer block, said additional second access hole being located in said lower end portion of said punch.

2. The system of claim 1 wherein the shank of said punch contains a teardrop recess, said recess adapted to lock with said ball lock when said shank is fitted into said central opening.

3. The system of claim 1 wherein said punch comprises a teardrop recess in said shank, a central threaded opening in said lower end portion, and an access hole located adjacent said central threaded opening.

4. A method of removing a punch from a retainer block which comprises:
(A) providing a punch having a shank adapted to lock with a ball lock located in said retainer block, said punch having a lower end portion with an access hole therein;
(B) providing a retainer block having a second access hole therein extending from said ball lock to the atmosphere and vertically aligning said second access hole with said access hole in said punch lower end portion;
(C) inserting a punch puller in an opening in said lower end portion of said punch;
(D) inserting a ball depressor through said access hole in said punch and said second access hole to thereby release said punch from said retainer block, and subsequently pulling said punch from said retainer block with said punch puller which is movably secured into said opening.

* * * * *